United States Patent [19]
Trost et al.
[11] 3,869,698
[45] Mar. 4, 1975

[54] OPTICAL CHARACTER RECOGNITION VIDEO AMPLIFIER AND DIGITIZER

[75] Inventors: Edward Trost, Philadelphia; Clifford E. Martin, Lansdale, both of Pa.

[73] Assignee: Mohawk Data Sciences Corporation, Herkimer, N.Y.

[22] Filed: Nov. 29, 1973

[21] Appl. No.: 420,128

[52] U.S. Cl. .......... 340/146.3 AG
[51] Int. Cl. .......... G06k 9/00
[58] Field of Search .......... 340/146.3 AG

[56] References Cited
UNITED STATES PATENTS

| | | | |
|---|---|---|---|
| 3,159,815 | 12/1964 | Groce | 340/146.3 AG |
| 3,225,213 | 12/1965 | Hinrichs et al. | 340/146.3 AG |
| 3,472,958 | 10/1969 | Estock | 340/146.3 AG |
| 3,519,991 | 7/1970 | Kobayashi | 340/146.3 AG |
| 3,599,151 | 8/1971 | Harr | 340/146.3 AG |

*Primary Examiner*—Gareth D. Shaw
*Assistant Examiner*—Leo H. Boudreau
*Attorney, Agent, or Firm*—Robert R. Hubbard

[57] ABSTRACT

A video amplifier and digitizer for use in combination with an array of photoconductive diodes for optical sensing in optical character recognition equipment. The video amplifier includes a noise filter and provides high gain for the signals from the diode array. The digitizer includes circuits for storing the peak "black" and "white" levels of the analog video signal and a comparison circuit for comparing the analog video signal with a threshold between the stored black and white levels to produce a digitized video output signal.

6 Claims, 4 Drawing Figures

OPTICAL CHARACTER RECOGNITION VIDEO AMPLIFIER AND DIGITIZER

This invention relates to optical character recognition equipment, and, more particularly, to a video amplifier and digitizer for use in combination with a photoconductive diode array for producing a digitized video signal corresponding to the light and dark patterns of optically scanned characters.

In the prior art optical character recognition equipment, the optical scanning of the information bearing documents has been accomplished by various devices including flying spot scanners, vidicon tubes and arrays of discrete photoconductive diodes. These optical scanning devices of the prior art have generally been large, complex and cumbersome and have required high operating voltages. However, the advent of integrated arrays of photoconductive diodes has made possible a considerable reduction in the size and complexity of the optical scanning devices used in optical character recognition equipment.

It is therefore an object of this invention to provide a video amplifier and digitizer for use in combination with an integrated array of photoconductive diodes.

It is also an object of this invention to provide a video amplifier and digitizer capable of compensating for variations in the reflectivity of the paper stock being scanned.

It is another object of this invention to provide a video amplifier and digitizer capable of compensating for character to character variations in print darkness.

It is still another object of this invention to provide a video amplifier and digitizer capable of producing a very low-noise digitized video signal corresponding to the light and dark patterns of the characters scanned by an integrated array of photoconductive diodes.

According to the above and oteher objects, the present invention provides a high gain video amplifier connected to the output of an integrated photoconductive diode array. The video amplifier includes an active filter for cutting off high frequency noise and optimizing low frequency ripple. The amplified video signal feeds into the digitizer which stores the peak black and white levels. The amplified video signal is also compared with a threshold derived from the stored black and white levels to produce the digitized video output. Negative feedback from the white storage circuit to the video amplifier serves to stabilize the stored white level and thus compensate for variations in the reflectance of the paper stock being scanned. The black storage circuit is periodically discharged by incremental amounts so that the stored black level is effectively reset for each new character scanned so as to avoid error due to variations in the print darkness from character to character.

Other objects and advantages of the present video amplifier and digitizer will be apparent from the following detailed description and accompanying drawings which set forth, by way of example, the principle of the present invention and the best mode contemplated of carrying out that principle.

IN THE DRAWINGS

Figure 1:
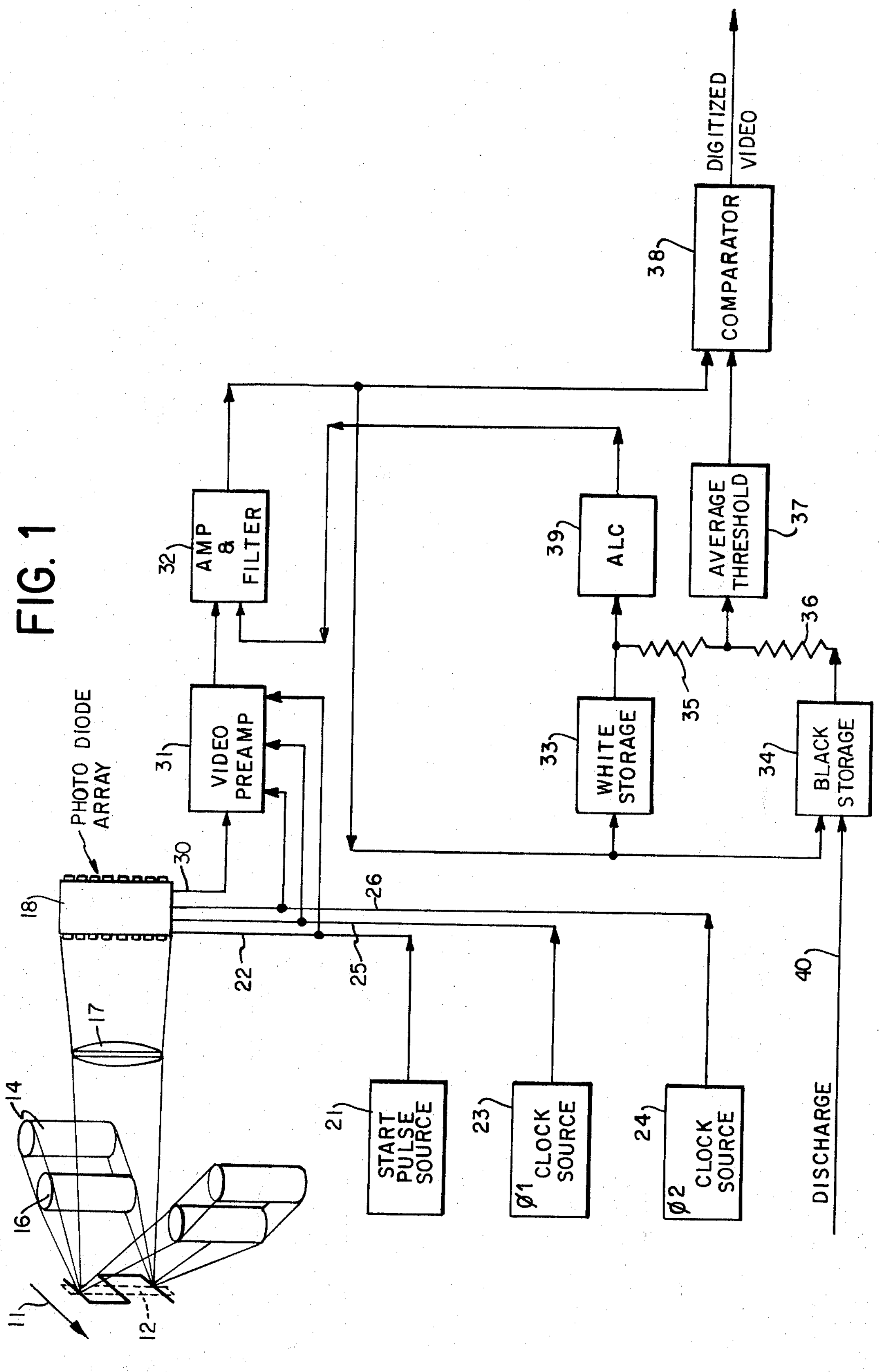
FIG. 1 is a block diagram of the present video amplifier and digitizer in combination with a diode array and the necessary optics for character scanning.

Referring in detail to FIG. 1 of the drawings, there is shown a block diagram of the subject video amplifier and digitizer in combination with a photoconductive diode array and the necessary optics for character scanning. The letter S shown in FIG. 1 represents a typical character in the process of being scanned. The character is caused to move in the direction indicated by arrow 11 by a suitable transport mechanism not shown. A narrow slice of the character is scanned as it passes beneath the window 12 of the scanning optics. In the preferred form of the present invention, the scanning rate is such that each character is scanned vertically approximately 40 times as it passes beneath window 12.

The portion of the character beneath window 12 is illuminated by means of tubular lamps 13 and 14 and their associated collimating lenses 15 and 16 respectively. A data collection lens 17 is positioned to focus the portion of the character beneath window 12 on the photodiode array 18. In the preferred form of the present invention, the photodiode array 18 includes about 64 photodiodes arranged in a line spaced 0.005 inch on centers. Such photodiode arrays are commercially available from a number of suppliers such as, for example, Fairchild Semiconductor Corp. of Van Nuys, Calif. The portion of the character to be scanned beneath window 12 is focused on the photodiode array 18 by lens 17 so that by scanning the photodiodes in sequence, a video signal is generated corresponding to the pattern of light and dark of the character beneath window 12.

Each scanning cycle of photodiode array 18 is initiated by a start pulse which is applied to the photodiode array 18 from start pulse source 21 via line 22. The scanning of the diode array is accomplished by a pair of clock signals applied to the photodiode array 18 from $\phi$ 1 clock source 23 and $\phi$ 2 clock source 24 via lines 25 and 26 respectively. The start pulse and the $\phi$ 1 and $\phi$ 2 clock signals are illustrated respectively by the waveforms 161, 162 and 163 of FIG. 3. Each of the clock signals has 32 cycles for each cycle of the start signal. The $\phi$ 1 clock is 180° out of phase with the $\phi$ 2 clock. The combined clock signals have 64 positive-going legs which serve to scan successively the 64 photodiodes of array 18.

The video output signal from photodiode array 18 is applied via line 30 to the video pre-amplifier 31. The start signal and the two clock signals are also applied to the video pre-amplifier 31 through a compensating network so as to compensate the video signal for nosie due to the start signal and clock signals and to optimize low-frequency ripple. The details of the compensating network will be described in greater detail in connection with FIGS. 2A and 2B.

The output signal from video pre-amplifier 31 is applied to amplifier and filter 32. The combined action of pre-amplifier 31 and amplifier and filter 32 serves to amplify the video signal by a factor of about 200. The amplifier and filter 32 includes a low-pass filter which serves to cut off frequencies above the maximum valid frequency which would be encountered as a result of scanning characters of the particular font concerned. For example, the upper cutoff frequency of the filter might typically be 500 khz.

The amplified video signal which appears at the output of amplifier and filter 32 is applied to a pair of storage devices 33 and 34. Storage device 33 stores the positive peak level of the amplified video signal from amplifier and filter 32. Since, in the preferred form of the present invention, the positive peak level of the amplified video signal corresponds to the white background of the document being scanned, storage device 33 is referred to as white storage.

Storage device 34 stores the negative peak level of the amplified video signal which corresponds to the black of the imprinted characters on the document being scanned. Accordingly, storage device 34 is sometimes referred to as black storage.

The positive peak voltage level stored in white storage device 33 and the negative peak voltage level stored in black storage device 34 are applied to a potential divider including resistors 35 and 36 to obtain a threshold voltage level that is approximately midway between the positive peak level and the negative peak level.

The threshold voltage level is applied through a unity gain amplifier 37 to comparator 38. The amplified video signal from amplifier and filter 32 is applied to the other input of comparator 38. The output signal from comparator 38 is a digitized video signal. More particularly, when the amplified analog video signal applied to the input of comparator 38 is greater than the threshold level, the output of the comparator 38 is at a first level, and when the amplified analog video signal is less than the threshold level, the output of comparator 38 is at a second level.

An automatic level control is provided in order to compensate for variations in the reflectivity or whiteness of the document being scanned. This is accomplished by means of negative feedback from white storage device 33 through automatic level control 39 to amplifier and filter 32. In the preferred form of the present invention, about 0ne-tenth of the white storage level is fed back, in the negative sense, to amplifier and filter 32 so as to stabilize the white storage level.

Provision is made for periodically discharging the black storage device 34 by incremental amounts so as to effectively allow the digitizing circuits to "start fresh" on each new character to be scanned. The discharge pulse occurs once each scanning cycle as shown by the waveform 164 of FIG. 3. The discharge pulse is applied via line 40 to the black storage device 34 which also receives the amplified video signal from amplifier and filter 32.

The effect of the discharge pulse on the voltage level stored in black storage device 34 is much less than the effect of a negative peak of the amplified video signal so that the discharge pulses have little effect on the stored black voltage level while a character is beneath the scanning window 12. However, during the spaces between characters, the repeated discharge pulses have a cumulative effect of substantially discharging the black storage device 34. As a result, the black storage device 34 will be effectively reset by the first negative peak of the amplified video signal corresponding to the first black portion of the next character scanned. In this way, the digitizer circuits respond to the particular shade of black of each individual character scanned.

In order to prevent the threshold voltage level from rising to the white level as a result of repeated discharging of the black storage device 34, the threshold amplifier 37 is provided with means for limiting the threshold voltage to a predetermined maximum upper level. For example, if the white voltage level is nominally +5v and the maximum black voltage level is −7v, the threshold voltage might be limited to a maximum of +3v. In this manner, spurious output pulses resulting from changes in the reflectivity of the document being scanned are prevented.

In the preferred form of the present invention, 40 to 60 discharge pulses are sufficient to discharge the black storage device 34 so that the threshold voltage will rise to its upper limit of +3v, for example.

Figure 2A:
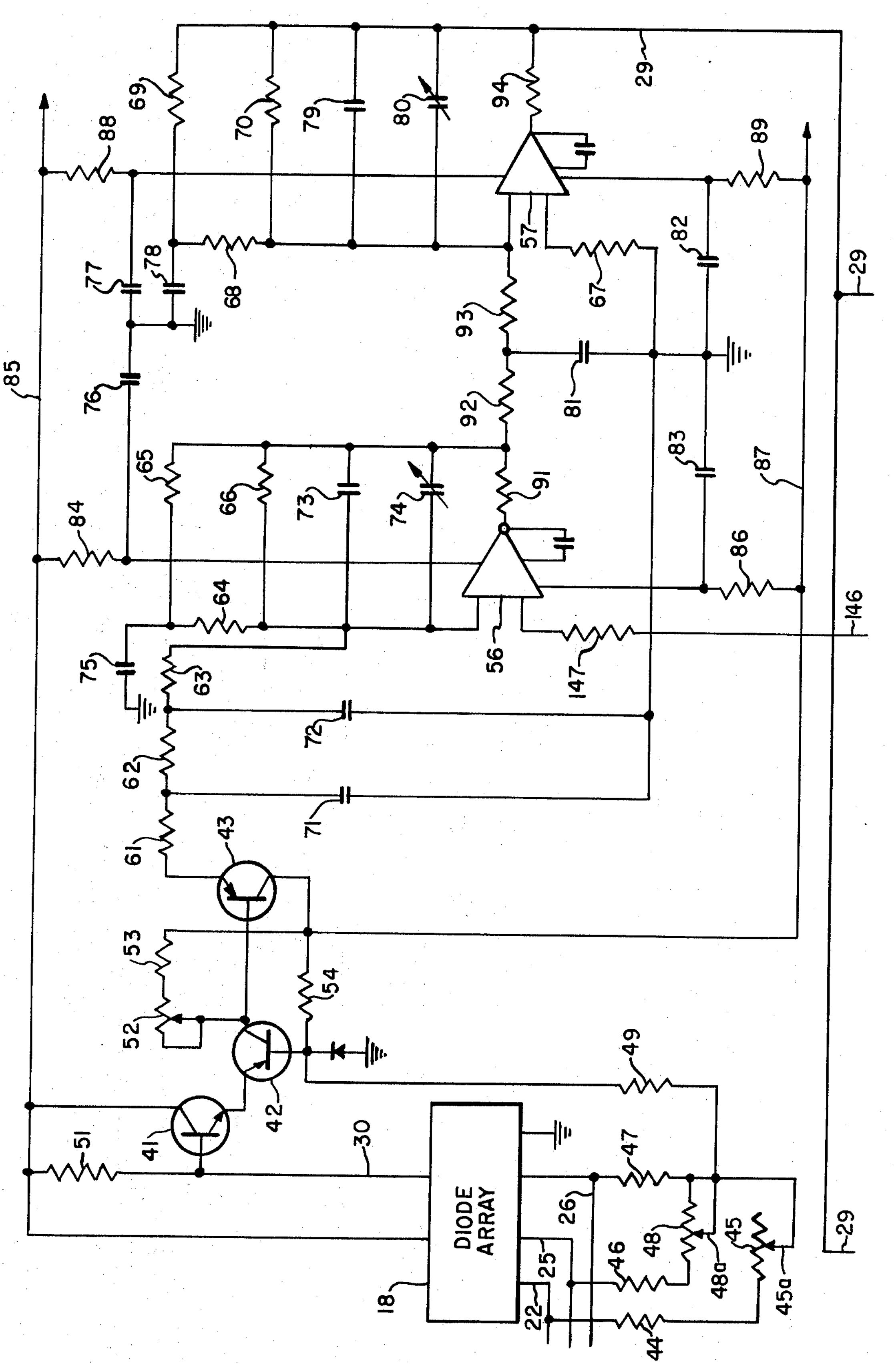
FIGS. 2A and 2B are a schematic diagram of the video amplifier and digitizer of FIG. 1.
Figures 2B, 3:
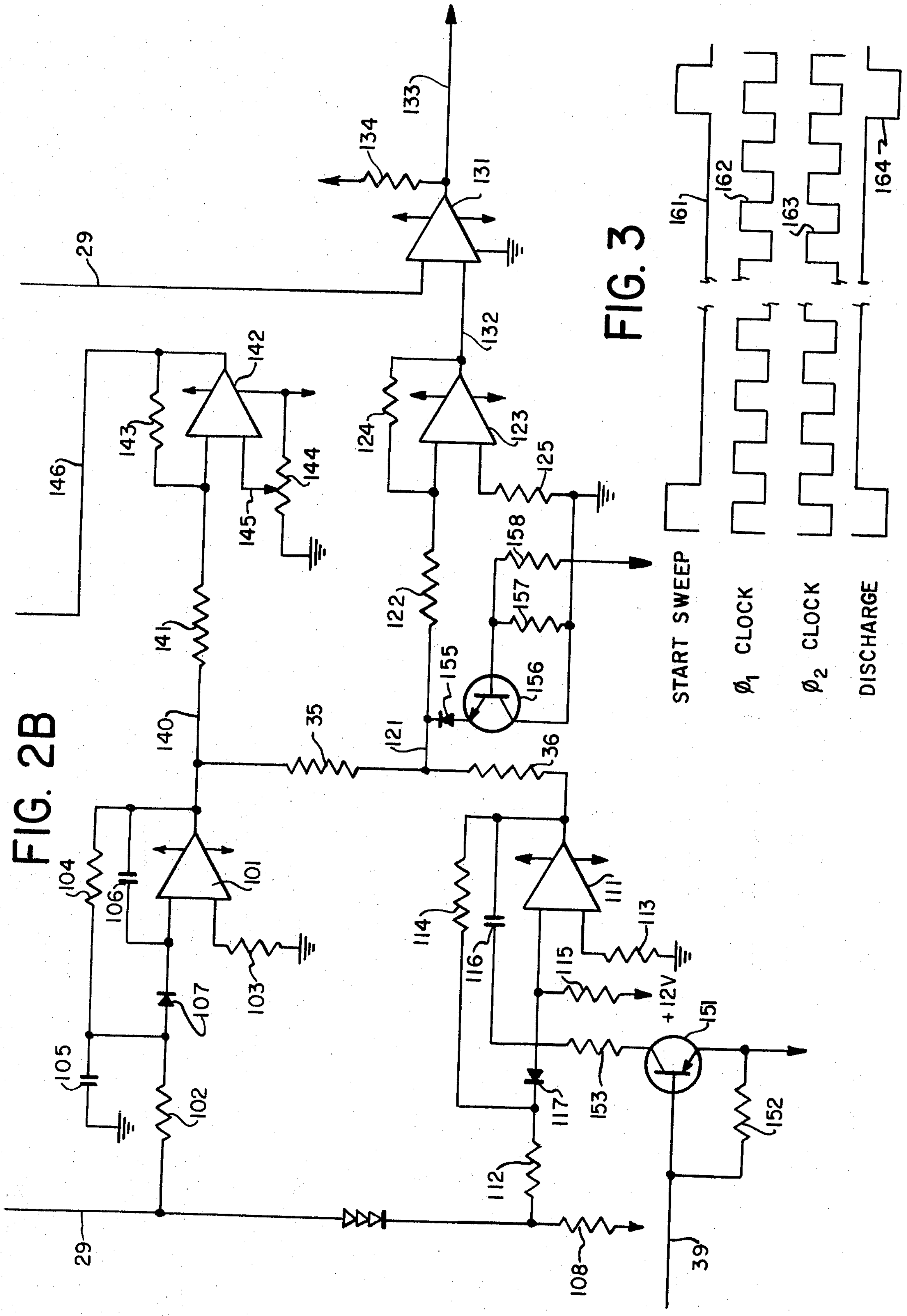
FIG. 3 is a timing diagram of the start, clock and discharge signal used in the subject video amplifier and digitizer.

Referring now to FIGS. 2A and 2B of the drawings, there is shown a schematic diagram of the video amplifier and digitizer which is shown in block diagram in FIG. 1. The video signal from diode array 18 is applied via line 30 to the base of transistor 41. Transistors 41, 22 and 43 are the active elements of the video preamplifier 31 shown in FIG. 1.

Portions of the start signal on line 22 and the $\phi$ 1 and $\phi$ 2 clock signals on lines 25 and 26 are fed through the network of resistors 44, 45, 46, 47, 48, and 49 to the base of transistor 42 in order to compensate for the noise introduced into the video signal by the start signal and $\phi$ 1 and $\phi$ 2 clock signals and thereby optimize the low frequency ripple of the resulting amplified analog video signal that appears on line 29. The movable taps 48*a* and 45*a* on resistors 48 and 45 respectively, enable the proportions of the $\phi$ 1 and $\phi$ 2 clock signals and the start signal to be adjusted in order to optimize the characteristics of the amplified analog video signal on line 29.

The output signal from transistor 43 is fed into a RC filter network to amplifiers 56 and 57. The RC filter network includes resistors 61–66, 68–70, 92, and 93 and capacitors 71–75, and 78–81. Amplifier 56 is connected through bias resistor 84 to the positive voltage supply 85, typically +12v. Resistor 86 connects amplifier 56 to the negative voltage supply 87, typically −12v. Similarly, amplifier 57 is connected by resistor 88 to the positive voltage supply and by resistor 89 to the negative voltage supply. Capacitors 76, 77, 82 and 83 stabilize these voltages. Resistor 67 stabilizes amplifier 57. The output from amplifier 56 feeds through resistors 91, 92 and 93 to an input of amplifier 57. The output from amplifier 57 feeds through resistor 94 to line 29 which carries the amplified analog video signal to the digitizer circuits illustrated in FIG. 2A.

The combined effect of transistors 41, 42 and 43 and amplifiers 56 and 57 serves to amplify the video signal from diode array 18 by a factor of approximately 200. The RC filter network serves as a low pass filter which serves to cut off frequencies above the maximum valid frequency which would be encountered as a result of scanning characters of the particular font concerned. For example, the upper cutoff frequency of the filter might typically be 500 khz.

The typical value is for the resistors shown in FIG. 2A are as follows:

| | |
|---|---|
| Resistors 44, 46, 47 | = 51K |
| Resistors 45, 48 | = 200K |
| Resistor 49 | = 27K |
| Resistor 51 | = 2.2MEG |
| Resistor 52 | = 5K |
| Resistor 53 | = 470Ω |
| Resistor 54 | = 56K |
| Resistors 61,63 | = 240Ω |

-Continued

| | |
|---|---|
| Resistor 62 | = 510Ω |
| Resistors 64, 65 | = 4.3K |
| Resistor 66 | = 24K |
| Resistor 67 | = 910Ω |
| Resistors 68, 69 | = 3.3K |
| Resistor 70 | = 30K |
| Capacitors 71, 72 | = 2200pf |
| Capacitors 73, 79 | = 47pf |
| Capacitors 74, 80 | = 15–60pf |
| Capacitor 75 | = 270pf |
| Capacitors 76, 77, 82, 83 | = 0.1 μf |
| Capacitor 78 | = 100pf |
| Capacitor 81 | = 1200pf |
| Resistors 84, 86, 88, 89 | = 10Ω |
| Resistors 91, 94 | = 100Ω |
| Resistors 92, 93 | = 510Ω |

Referring now to FIG. 2B of the drawings, the amplified analog video signal on line 29 is fed into the white storage device which includes amplifier 101 and its associated resistors 102, 103, and 104, capacitors 105 and 106 and diode 107. As explained above in connection with FIG. 1, the white storage device serves to store the Peak Positive volt level of the analog video signal which corresponds to the white background on which the characters are printed. Hence, the peak positive voltage level of the analog video signal will vary with the reflectivity of the document being scanned.

The analog video signal on line 29 is also fed into the black storage device including amplifier 111 and its associated resistors 112, 113, 114 and 115, capacitor 116 and diode 117. The black storage device serves to store the negative peak level of the amplified analog video signal which corresponds to the darkest portion of the character being scanned. Variations may occur in the negative peaks of the video signal, but the black storage device stores the most negative peak for reference purposes.

The stored white voltage level which appears at the output of amplifier 101 and the stored black voltage level which appears at the output of amplifier 111 are applied across the voltage divider formed by resistors 35 and 36. In the preferred form of the present invention resistors 35 and 36 are of approximately equal value so that the resulting voltage which appears on line 121 is approximately midway between the stored white voltage level and the stored black voltage level. More particularly, in the embodiment shown in FIG. 2B, resistor 35 has a value of 1k and resistor 36 has a value of 820 ohms.

The threshold voltage level on line 121 is fed through resistor 122 to amplifying device 123. Resistors 122 and 124 are preferably of equal value, for example 10k, so as to provide unity gain. Amplifying device 123 is also provided with a stability resistor 125 to ground.

The output from amplifying device 123 is fed into amplifying device 131 together with the amplified analog video signal on line 29. Amplifying device 131 serves as a comparator which compares the amplified analog video signal on line 29 with the threshold level on line 132 and produces a two-valued, or "digital" output signal on line 133 depending upon whether the video signal is greater than or less than the threshold level. For example, if the video signal on line 29 is greater than the threshold level on line 132, the output signal on line 133 will be at is lower level. If the video signal on line 29 is less than the threshold level on line 132, the output signal on line 133 will be at its upper level.

In order to stabilize the white voltage level which appears at the output of amplifying device 101, negative feedback is provided from the white storage device to the amplifying device 56 shown in FIG. 2A. More particularly, the white voltage level on line 140 is applied to an automatic linearity control including amplifying device 142 and resistors 141, 143, and 144. Resistor 144 is provided with a movable tap 145 in order that the operator can adjust negative feedback reference level. Typically, about one/tenth of the white voltage level would be fed back via line 146 through resistor 147 to amplifying device 56 shown in FIG. 2A. As a result of this negative feedback, the white voltage level can be stabilized at a particular value, such as for example +5v, despite variations in the reflectivity of the document being scanned.

As described above in connection with FIG. 1, means are provided for incrementally discharging the black storage device so as to allow for variations in the darkness of the print of the characters being scanned without causing errors in the digitized video output signal on line 133. The incremental discharging of the black storage device is accomplished by discharge pulses on line 39 which are coupled through transistor 151 and resistors 152 and 153 to discharge the black voltage level stored in amplifying device 111.

In order to prevent the threshold level on line 121 from rising too close to the white storage level as a result of the repeated incremental discharging of the black storage device, diode 155, transistor 156 and resistors 157 and 158 are provided to put a ceiling (typically +3v) on the threshold voltage level that appears on line 132. This ceiling is necessary in order to avoid spurious output signals as a result of changes in the reflectivity of the document being scanned after a prolonged blank space on the document.

Typical values for the components shown in FIG. 2 B are as follows:

| | |
|---|---|
| Resistors 102, 104, 112, 114, 134, 141, 152 | = 10K |
| Resistors 103, 108, 113 | = 5.1K |
| Capacitors 106, 116 | = 100pf |
| Resistor 115 | = 5.6MEG |
| Resistor 125 | = 1.8K |
| Resistor 144 | = 5K |
| Resistor 153 | = 30K |
| Resistor 157 | = 300Ω |
| Resistor 158 | = 1.5K |
| Resistor 143 | = 1K |

While the principles of the present invention have been illustrated by reference to a specific embodiment of the subject video amplifier and digitizer, it will be appreciated by those skilled in the art that various modifications and adaptations can be made without departing from the spirit and scope of the present invention which are set forth with particularity in the appended claims:

What is claimed is:

1. In optical character recognition apparatus including an array of photoconductive diodes for optically scanning the characters to be recognized, a source of start signals for starting the scanning of the diode array, and a source of clock signals for sequencing the scanning of the diode array; a video amplifier and digitizer comprising:

an amplifier connected to said diode array for receiving and amplifying the video signal from said diode array;

first and second storage means connected to said amplifier for storing the positive and negative peak values, respectively, of said video signal, one of said peak values corresponding to the light background of the characters to be recognized and the other peak value corresponding to the dark portions of the characters to be recognized;

means connected to said first and second storage means for deriving a threshold level between said positive peak value and said negative value;

comparison means responsive to said amplified video signal and said threshold level for producing a digitized output signal having a first level when said amplified video signal is more positive than said threshold level and a second level when said amplified video signal is more negative than said threshold level; and negative feedback means connected between the storage means storing said one peak value corresponding to the light background and said amplifier for stabilizing said one peak value of the amplified video signal, despite variations in the reflectivity of the light background of the characters to be recognized.

2. The optical character recognition apparatus of claim 1 wherein said threshold level is substantially midway between said positive peak level and said negative peak level.

3. The optical character recognition apparatus of claim 1 further comprising:

a compensating network connected between said start and clock signal sources and said amplifier for compensating said video signal to optimize low frequency ripple.

4. The optical character recognition apparatus of claim 1 further comprising:

means for periodically discharging said second storage means by incremental amounts so as to cause the voltage stored in said second storage means to change slowly in the positive direction in the absence of negative peaks of said amplified video signal.

5. The optical character recognition apparatus of claim 4, further comprising:

means for limiting said threshold level to less than a predetermined voltage.

6. The optical character recognition apparatus of claim 1 wherein said amplifier means includes a lowpass filter for cutting off noise above a predetermined frequency.

* * * * *